United States Patent
Roche et al.

(10) Patent No.: US 11,845,366 B2
(45) Date of Patent: Dec. 19, 2023

(54) VEHICLE SEAT

(71) Applicant: FAURECIA Sièges d'Automobile, Nanterre (FR)

(72) Inventors: Sylvain Roche, Varennes Changy (FR); David Epaud, Lardy (FR); Farouk Bouzid, Bretigny sur Orge (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/703,463

(22) Filed: Mar. 24, 2022

(65) Prior Publication Data
US 2022/0314842 A1 Oct. 6, 2022

(30) Foreign Application Priority Data

Mar. 30, 2021 (FR) ..................................... 21 03236

(51) Int. Cl.
| | |
|---|---|
| *B60N 2/00* | (2006.01) |
| *B60N 2/12* | (2006.01) |
| *B60N 2/04* | (2006.01) |
| *B60N 2/02* | (2006.01) |

(52) U.S. Cl.
CPC ........... *B60N 2/12* (2013.01); *B60N 2/02246* (2023.08); *B60N 2/045* (2013.01)

(58) Field of Classification Search
None
See application file for complete search history.

(56) References Cited

U.S. PATENT DOCUMENTS

| | | | | |
|---|---|---|---|---|
| 5,688,026 A | * | 11/1997 | Reubeuze | B60N 2/123 |
| | | | | 297/341 |
| 6,334,643 B1 | * | 1/2002 | Lindblad | B60N 2/4228 |
| | | | | 296/65.09 |
| 10,065,536 B2 | * | 9/2018 | Poniatowski | B60N 2/43 |
| 10,308,146 B1 | | 6/2019 | Kish | |

(Continued)

FOREIGN PATENT DOCUMENTS

| | | |
|---|---|---|
| DE | 102013006485 A1 | 11/2013 |
| DE | 102013007445 A1 | 11/2013 |

(Continued)

OTHER PUBLICATIONS

French Preliminary Search Report for French App. No. 2103236 dated Jan. 21, 2022, 10 pages, no English translation available.

(Continued)

*Primary Examiner* — Steven M Marsh
(74) *Attorney, Agent, or Firm* — BARNES & THORNBURG LLP

(57) ABSTRACT

A seat of a vehicle comprising a seat base, fixation means for fixing to the floor of a vehicle, a front connecting rod pivoting along a first axis at the fixation means and along a second axis at the base, a lower rear connecting rod pivoting along a third axis at the fixation means, an upper rear connecting rod pivoting along a fourth axis at the base and along a fifth axis at the lower rear connecting rod, a locking means able to transition: from a locked state, wherein it prevents the rotation of the lower rear connecting rod in relation to the upper rear connecting rod, to an unlocked state, wherein it enables the rotation of the lower rear connecting rod in relation to the upper rear connecting rod, and conversely.

21 Claims, 10 Drawing Sheets

(56) References Cited

U.S. PATENT DOCUMENTS

| | | | |
|---|---|---|---|
| 2015/0375637 A1* | 12/2015 | Kikuchi | B60N 2/10 297/316 |
| 2019/0135138 A1 | 5/2019 | Duhamel | |
| 2020/0406791 A1 | 12/2020 | Epaud | |
| 2022/0009389 A1* | 1/2022 | Epaud | B60N 2/20 |
| 2022/0169154 A1* | 6/2022 | Roche | B60N 2/3011 |
| 2022/0363170 A1* | 11/2022 | Lindenberg | B60N 2/206 |
| 2023/0028374 A1* | 1/2023 | Dill | B60N 2/12 |

FOREIGN PATENT DOCUMENTS

| | | |
|---|---|---|
| DE | 102017215929 A1 | 3/2019 |
| FR | 3069204 A1 | 1/2019 |
| FR | 3097815 A1 | 1/2021 |
| WO | 2003013903 A1 | 2/2003 |

OTHER PUBLICATIONS

German Office Action for German Patent App. No. DE 10 2022 106 318.6 dated May 26, 2023, counterpart to U.S. Appl. No. 17/703,463, No English translation available. 5 pages.

\* cited by examiner

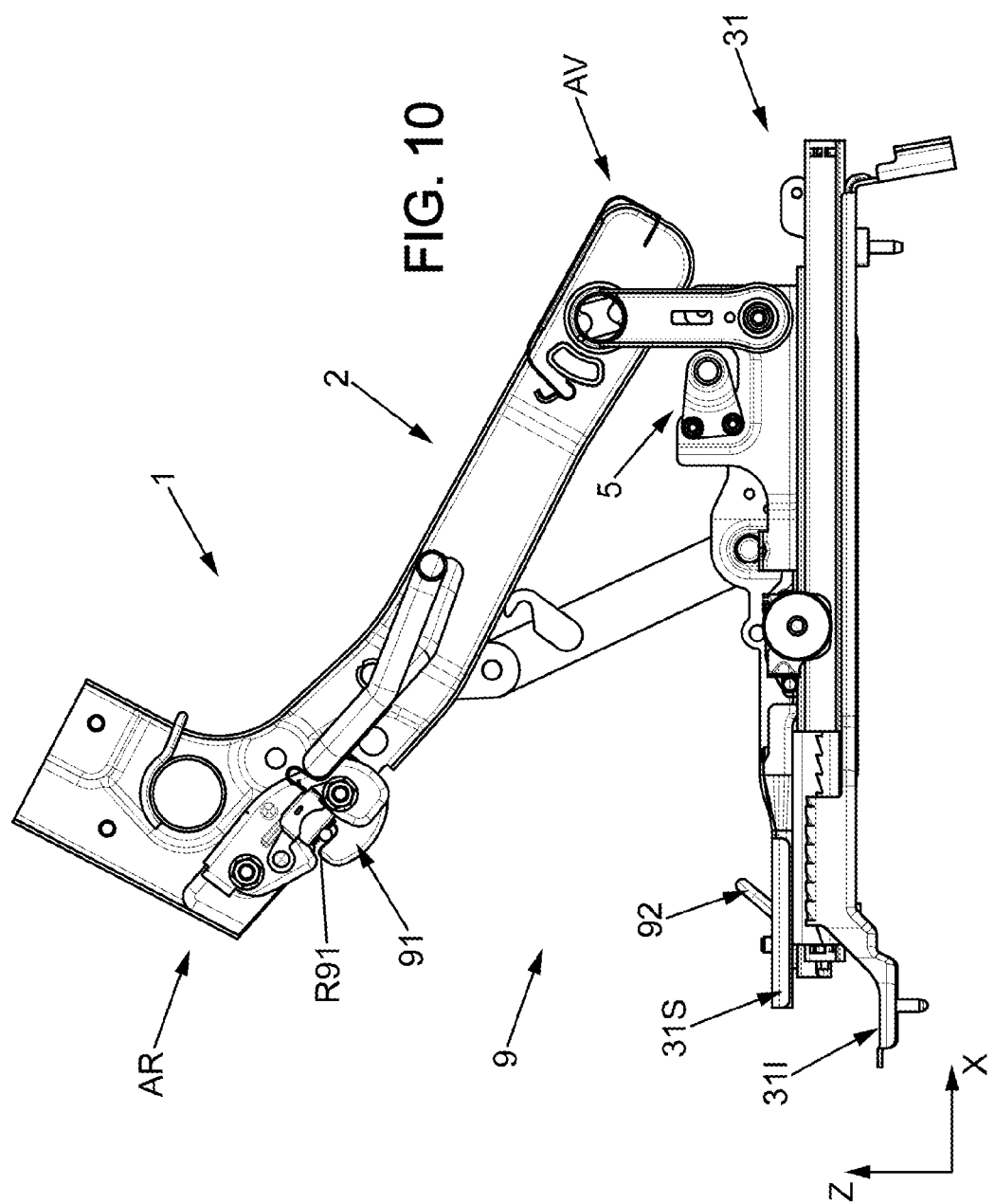

VEHICLE SEAT

PRIORITY CLAIM

This application claims priority to French Patent Application No. FR2103236, filed Mar. 30, 2021, which is expressly incorporated by reference herein.

BACKGROUND

The present disclosure relates to a seat for a vehicle, and particularly a motor vehicle, as well as to a vehicle equipped with such a seat.

SUMMARY

According to the present disclosure, a vehicle seat comprises a seat base presenting a front edge and a rear edge interconnected by a first lateral edge and a second lateral edge, fixation means for fixing the seat base to the floor of a vehicle, and connection means for connecting the seat base to the fixation means. The connection means is configured so as to enable the displacement of the seat base in relation to the fixation means along the longitudinal direction and along the vertical direction of the seat.

In illustrative embodiments, the connection means comprise:
  a front connecting rod presenting a first longitudinal end pivotably hinged along a first transverse axis of the seat to the fixation means and a second longitudinal end pivotably hinged along a second transverse axis to the seat base, at its front edge,
  a lower rear connecting rod presenting a first longitudinal end pivotably hinged along a third transverse axis of the seat to the fixation means and a second longitudinal end,
  an upper rear connecting rod presenting a first longitudinal end pivotably hinged along a fourth transverse axis to the seat base, at its rear edge, and a second longitudinal end pivotably hinged along a fifth transverse axis to the second longitudinal end of the lower rear connecting rod.

In illustrative embodiments, the seat further comprises a non-reversible electric motor configured to:
  drive the rotation of the front connecting rod in relation to the fixation means about the first transverse axis at its first longitudinal end, when activated, and
  block the rotation of the front connecting rod in relation to the fixation means about the first transverse axis at its first longitudinal end, when inactivated.

In illustrative embodiments, the seat further comprises a first locking means able to transition:
  from a locked state, wherein the first locking means prevents the rotation of the lower rear connecting rod in relation to the upper rear connecting rod about the fifth transverse axis, to
  an unlocked state, wherein the first locking means enables the rotation of the lower rear connecting rod in relation to the upper rear connecting rod about the fifth transverse axis, so as to enable pivoting of the seat base at the second longitudinal end of the front connecting rod about the second transverse axis of the seat so as to move the rear edge of the seat base away from or closer to the fixation means along the vertical direction of the seat, and conversely.

According to optional characteristics of the present disclosure, taken alone or in combination:
  the first locking means is arranged to be able to transition from its locked state to its unlocked state only when the non-reversible motor is inactivated;
  the first locking means comprises:
    a hook pivotably mounted on the lower rear connecting rod along a sixth transverse axis of the seat,
    a pin arranged on the upper rear connecting rod and extending along the transverse direction of the seat, the hook and the pin being configured such that the first locking means transitions from its locked state to its unlocked state, and conversely, by rotation of the hook in relation to the lower rear connecting rod about the sixth transverse axis of the seat, with:
    the hook engaged with the pin in the locked state of the first locking means, and
    the hook separated from the pin in the unlocked state of the first locking means;
  the hook is pivotably mounted on the lower rear connecting rod along the sixth transverse axis at an intermediate point of the lower rear connecting rod between the first longitudinal end and the second longitudinal end;
  the seat further comprises a first manual control means coupled to the first locking means, the first control means being configured so as to drive the transition of the first locking means from its locked state to its unlocked state, and conversely, under the effect of a manual action by a user on the first manual control means;
  the first manual control means comprises a knob pivotably mounted on the seat base along a seventh transverse axis of the seat, the knob being configured to transition:
    from a first position about the seventh transverse axis of the seat, wherein the first locking means is in its locked state, to
    a second position about the seventh transverse axis of the seat, wherein the first locking means is in its unlocked state;
  the first manual control means comprises a spring element configured to urge the knob into the second position about the seventh transverse axis of the seat;
  the knob is mounted on the seat base at its rear edge, projecting towards the bottom of the seat base along the vertical direction of the seat;
  the fixation means comprise two slide rails, arranged on both sides of the lower base along the transverse direction of the lower base, each presenting a lower profile configured to be fixed to the floor of the vehicle, and slidingly receiving, along the longitudinal direction of the seat, an upper profile, and the first longitudinal end of the front connecting rod and the first longitudinal end of the lower rear connecting rod are pivotably hinged, respectively along the first transverse axis and along the third transverse axis, to the upper profile of a slide rail;
  the seat further comprises a second locking means for locking the slide rails, configured to transition:
    from a locked state, wherein the second locking means prevents the sliding of the upper profile of each of the slide rails in relation to the lower profile of each of the slide rails, so as to prevent the translational displacement of the seat in relation to the floor of the vehicle along the longitudinal direction of the seat, to
    an unlocked state, wherein the second locking means enables the sliding of the upper profile of each of the slide rails in relation to the lower profile of each of the slide rails, so as to enable the translational displacement of the seat in relation to the floor of the vehicle along the longitudinal direction of the seat, and conversely, and the control means cooperates with the slide rail locking means such that a manual action by a user on the control means enables the locking means to transition from its locked state to its unlocked state, and conversely;

the seat further comprises a second manual control means coupled to the second locking means, the second manual control means being configured so as to drive the transition of the second locking means from its locked state to its unlocked state, and conversely, under the effect of a manual action by a user on the second manual control means;

the second manual control means is the first manual control means, such that a manual action by a user on the first manual control means enables the second locking means to transition from its locked state to its unlocked state, and conversely;

the seat further comprises a third locking means for locking the seat base in relation to the fixation means, configured to transition:

from a locked state, wherein the third locking means prevents the displacement of the seat base in relation to the fixation means by use of the connection means, to an unlocked state, wherein the third locking means enables the displacement of the seat base in relation to the fixation means by use of the connection means, and conversely;

the seat further comprises a third manual control means coupled to the third locking means, the third manual control means being configured so as to drive the transition of the third locking means from its locked state to its unlocked state and conversely, under the effect of a manual action by a user on the third manual control means;

the third manual control means is the first manual control means, such that a manual action by a user on the first manual control means enables the third locking means to transition from its locked state to its unlocked state, and conversely;

the second longitudinal end of the front connecting rod is pivotably hinged to the first or to the second lateral edge of the seat base along the second transverse axis, and/or the first longitudinal end of the upper rear connecting rod is pivotably hinged to the first or to the second lateral edge of the seat base along the fourth transverse axis;

the connection means comprise:

two parallel front connecting rods that are notably identical, each positioned on one side of the seat base along the transverse direction of the seat, and/or two parallel lower rear connecting rods that are notably identical, each positioned on one side of the seat base along the transverse direction of the seat, and/or two parallel upper rear connecting rods that are notably identical, each positioned on one side of the seat base along the transverse direction of the seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 10 shows a detail view in section along line X-X from FIG. 7 of the seat from FIG. 7.

DETAILED DESCRIPTION

Figure 1:
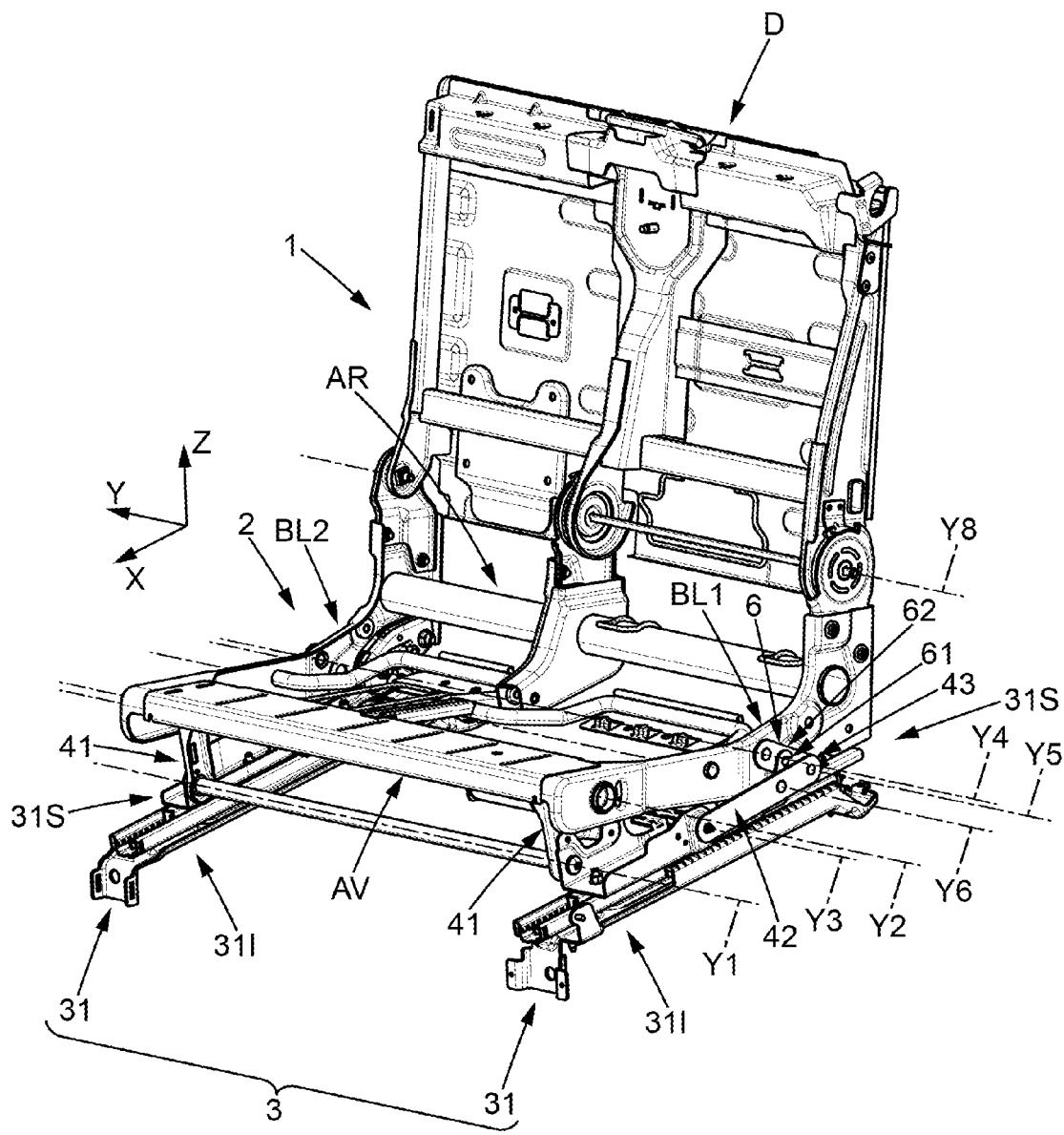
FIG. 1 shows a perspective view of a vehicle seat according to an embodiment in accordance with the present disclosure, in a first configuration referred to as nominal.
Figure 2:
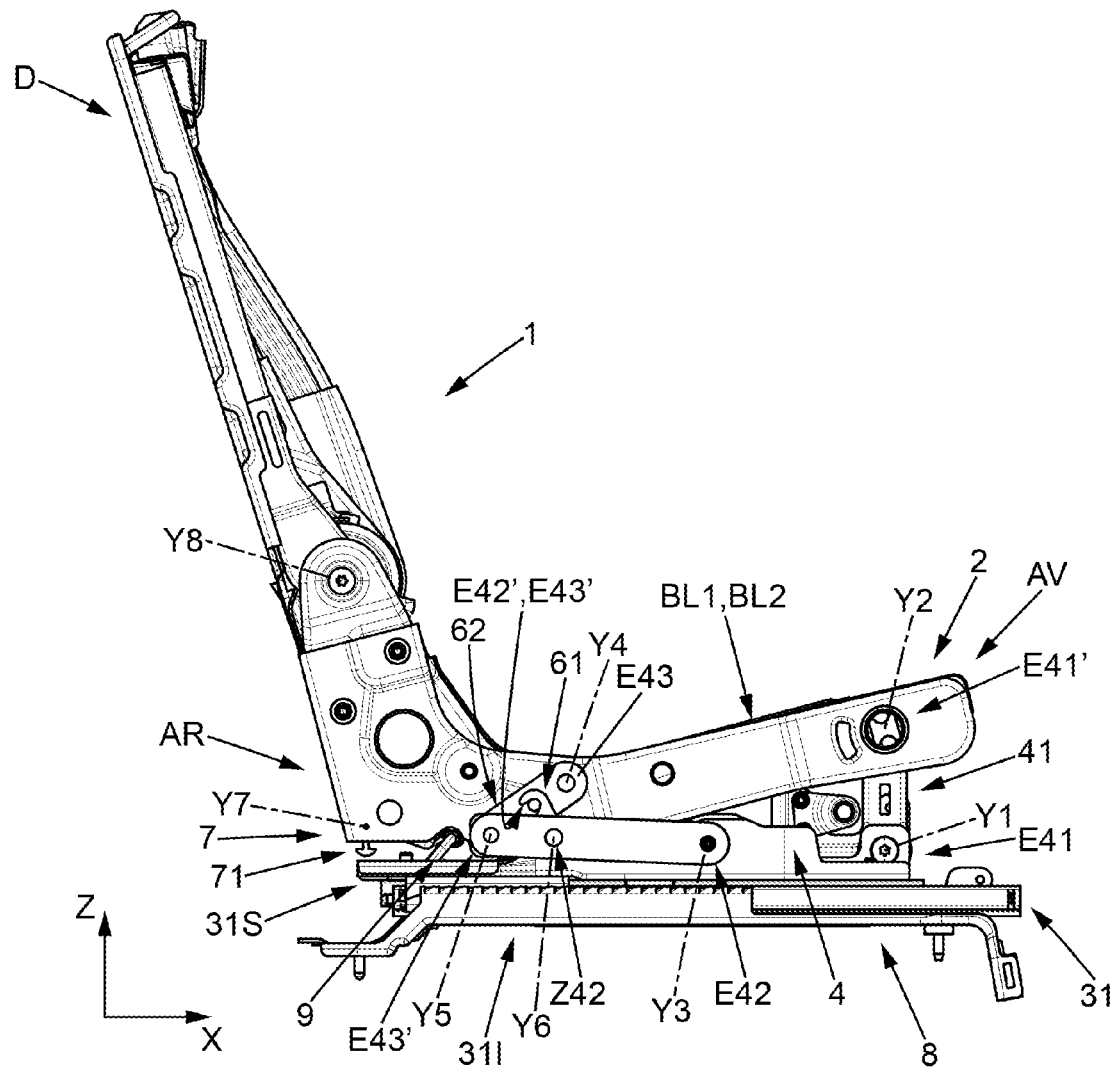
FIG. 2 shows a side view of the seat from FIG. 1, wherein certain elements have been made transparent.
Figure 3:
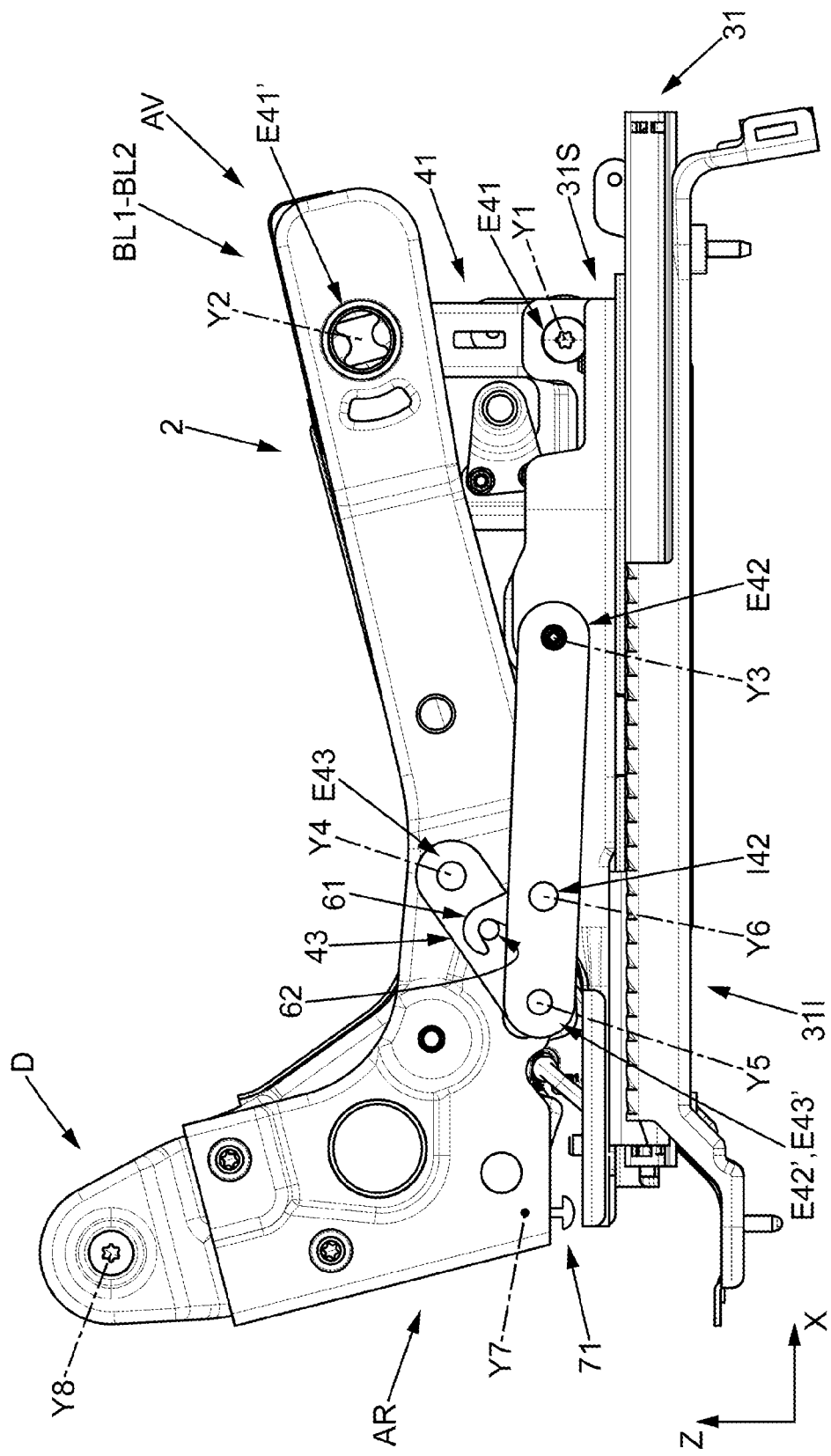
FIG. 3 shows a detail view of FIG. 2.
Figure 4:
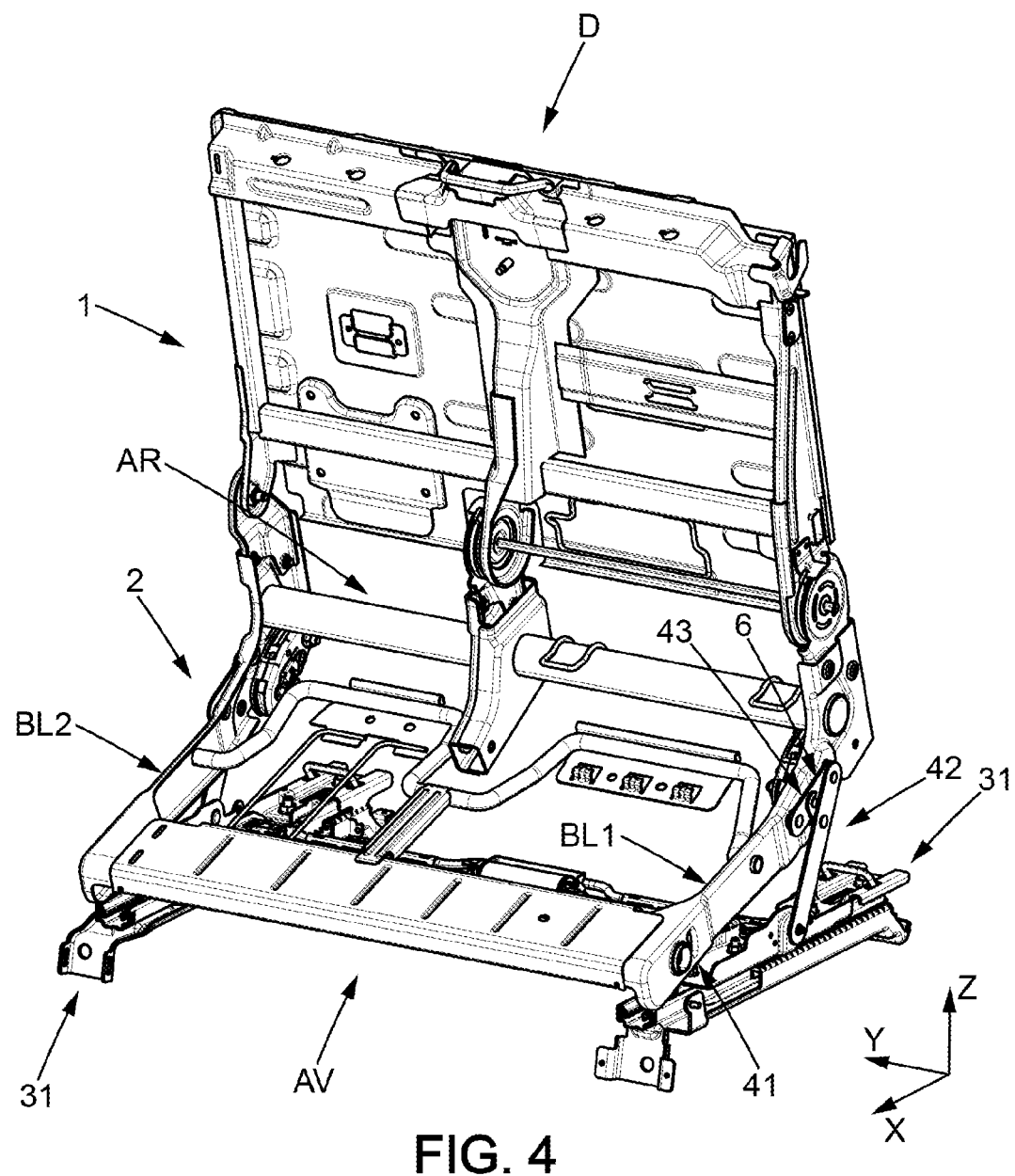
FIG. 4 shows a perspective view of a vehicle seat according to an embodiment in accordance with the present disclosure, in a second configuration referred to as easy entry.
Figure 5:
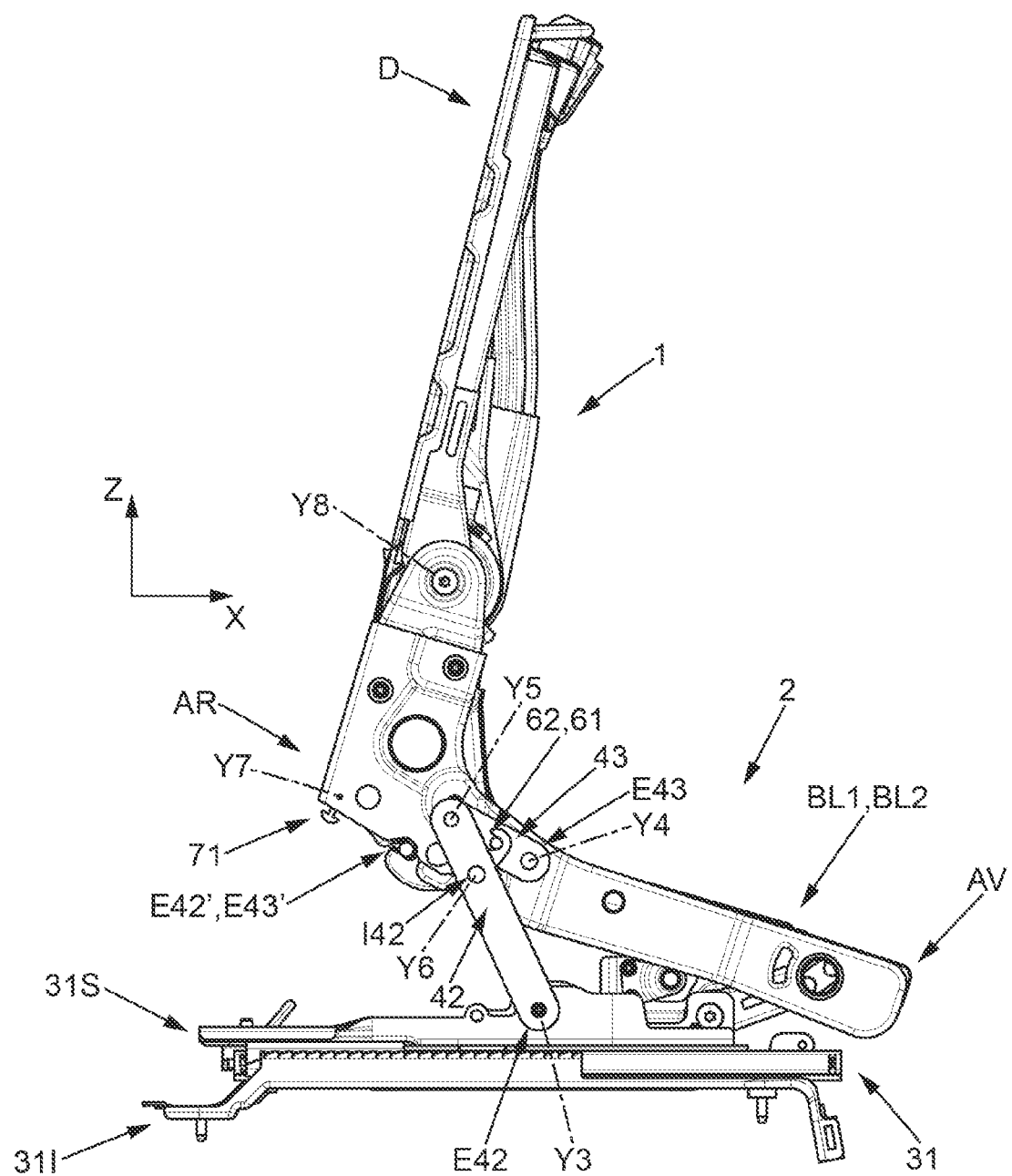
FIG. 5 shows a side view of the seat from FIG. 4, wherein certain elements have been made transparent.
Figure 6:
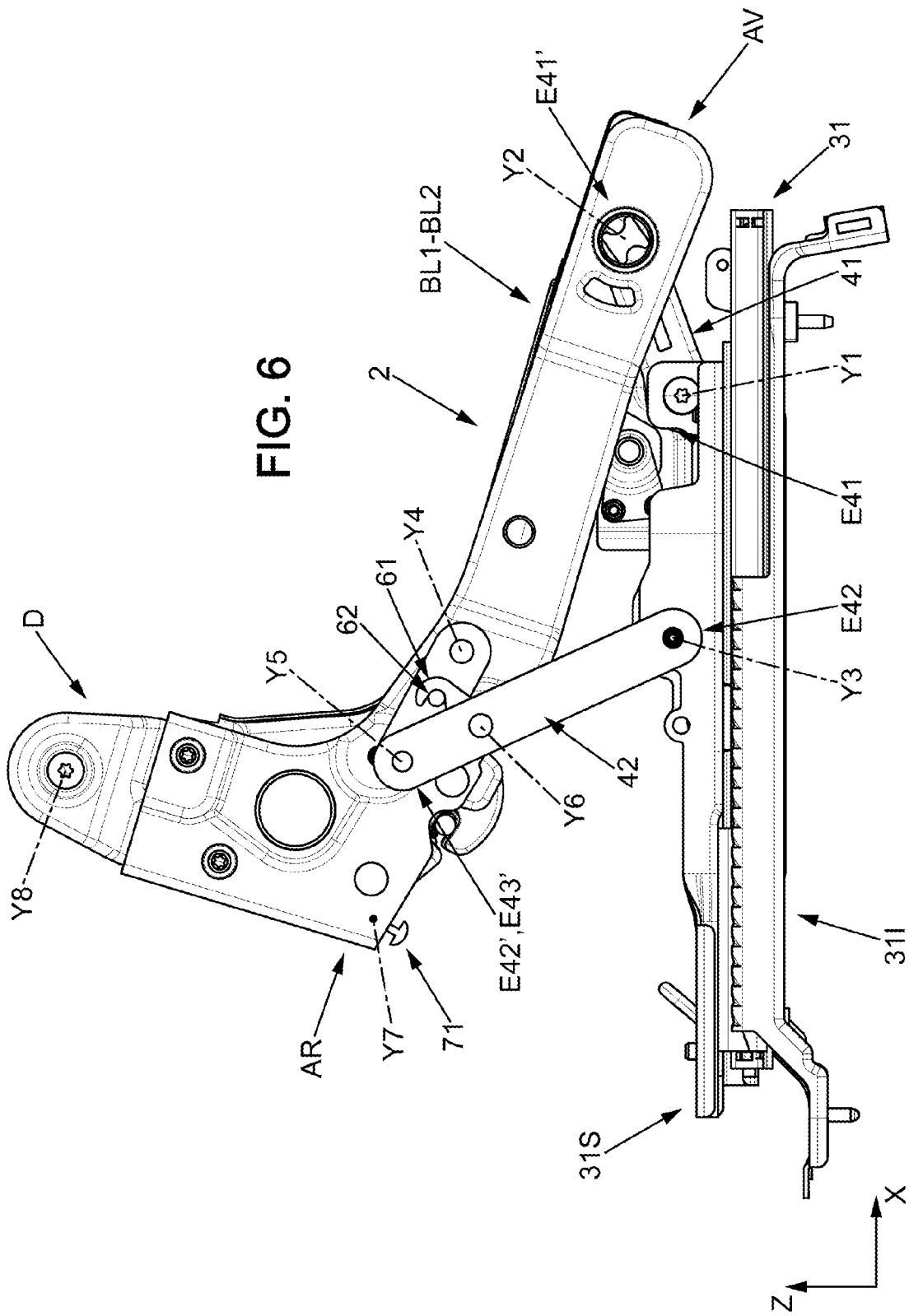
FIG. 6 shows a detail view of FIG. 5.
Figure 7:
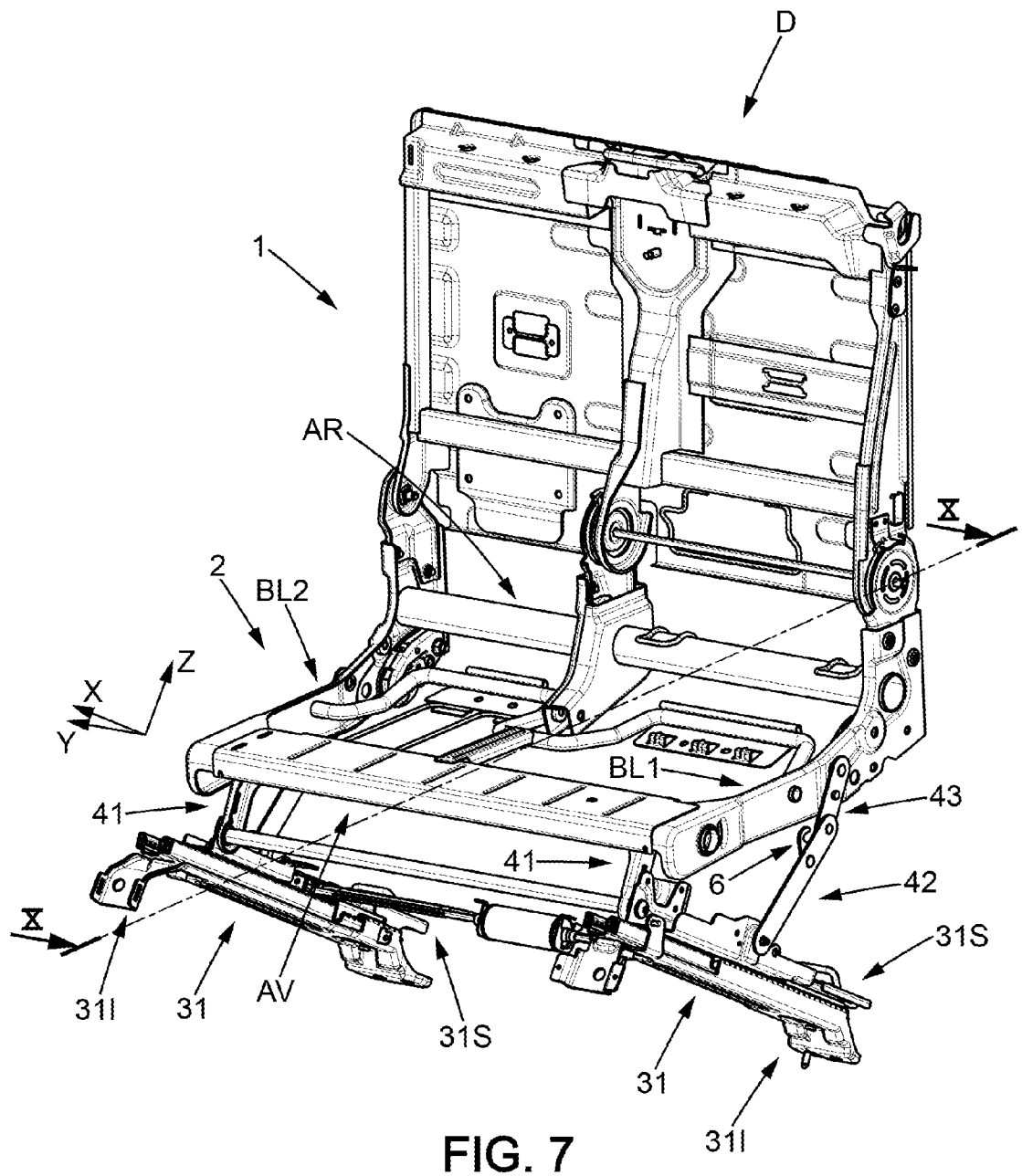
FIG. 7 shows a perspective view of a vehicle seat according to an embodiment in accordance with the present disclosure, in a third configuration referred to as panic exit.

In the entirety of the present application, the spatial directions are defined as follows:

the longitudinal direction X of the seat corresponds to the sliding direction of the seat in relation to the floor of the vehicle along slide rails, when the seat comprises slide rails as fixation means for fixing to the floor of the vehicle, received on the seat base of the seat, as represented in the examples of embodiment of FIG. 1 to 9, the vertical direction Z of the seat corresponds to the direction perpendicular to the plane of the floor of the vehicle to which the seat is fixed, also perpendicular to the longitudinal direction X of the seat, defined above, as represented in the embodiment examples from FIG. 1 to 9, the transverse direction Y of the seat is the direction perpendicular to the longitudinal direction and to the vertical direction, as represented in the embodiment examples of FIGS. 1, 4 and 7.

In addition, a plane of the seat is defined according to the directions of the seat that it contains.

An axis is defined as a straight line along a specific direction. For example, a transverse axis is an axis along the transverse direction.

Also, front and rear are to be understood according to the longitudinal direction of the seat, with an orientation from the rear edge of the seat base, at which a seat backrest is generally hinged, towards the front edge of the seat base.

In addition, upper and lower are to be understood according to the vertical direction of the seat, with an orientation from the fixation means for fixing to the floor of the vehicle, and particularly the slide rails, towards the seat base of the seat.

Lastly, in the entirety of the present application, substantially longitudinal, transverse or vertical is understood to refer to an orientation in relation to the longitudinal direction, the vertical direction or the transverse direction, with an angle of less than 30°, which may advantageously be zero.

In addition, substantially parallel is understood to refer to an orientation in relation to a given element with an angle of less than 30°, which may advantageously be zero.

The present relates to a vehicle seat 1 comprising:
- a seat base 2 presenting a front edge AV and a rear edge AR interconnected by a first lateral edge BL1 and a second lateral edge BL2,
- fixation means 3 for fixing the seat base 2 to the floor of a vehicle,
- connection means 4 for connecting the seat base 2 to the fixation means 3, configured so as to enable the displacement of the seat base 2 in relation to the fixation means 3 along the longitudinal direction X and along the vertical direction Z of the seat 1.

Seat 1 may also present a backrest D, pivotably hinged to seat base 2 along an eighth transverse axis Y8 of seat 1, at the rear edge AR of seat base 2.

In the embodiment examples of FIG. 1 to 9, seat 1 presents a seat base 2 capable of receiving two users seated side-by-side, as well as a backrest D, also capable of receiving two users seated side-by-side. Without departing from the scope of the present disclosure, seat base 2, or even backrest D, could be capable of receiving a different number of users, advantageously between one and four.

According to the present disclosure, the connection means 4 comprise:
- a front connecting rod 41 presenting a first longitudinal end E41 pivotably hinged along a first transverse axis Y1 of seat 1 to fixation means 3 and a second longitudinal end E41' pivotably hinged along a second transverse axis Y2 to seat base 2, at its front edge (AV),
- a lower rear connecting rod 42 presenting a first longitudinal end E42 pivotably hinged along a third transverse axis Y3 of seat 1 to fixation means 3, and a second longitudinal end E42',
- an upper rear connecting rod 43 presenting a first longitudinal end E43 pivotably hinged along a fourth transverse axis Y4 to seat base 2, at its rear edge AR, and a second longitudinal end E43', pivotably hinged along a fifth transverse axis Y5 to the second longitudinal end E42' of the lower rear connecting rod 42.

According to the present disclosure, seat 1 further comprises a non-reversible electric motor 5 configured to:
- drive the rotation of front connecting rod 41 in relation to fixation means 3 about the first transverse axis Y1 at its first longitudinal end E41, when activated, and
- prevent the rotation of front connecting rod 41 in relation to fixation means 3 about the first transverse axis Y1 at its first longitudinal end E41, when inactivated.

According to the present disclosure, seat 1 further comprises a first locking means 6 able to transition:
- from a locked state, wherein the first locking means 6 prevents the rotation of lower rear connecting rod 42 in relation to upper rear connecting rod 43 about the fifth transverse axis Y5, to
- an unlocked state, wherein the first locking means 6 enables the rotation of lower rear connecting rod 42 in relation to the upper rear connecting rod 43 about the fifth transverse axis Y5, so as to enable pivoting of seat base 2 at the second longitudinal end E41' of front connecting rod 41 about the second transverse axis Y2 of seat 1 so as to move the rear edge AR of seat base 2 away from or closer to fixation means 3 along the vertical direction Z of seat 1, and conversely.

Therefore, seat 1 according to the present disclosure uses a non-reversible electric motor 5 to drive the displacement of seat base 2 in relation to fixation means 3, and not a reversible motor as in comparable vehicle seats.

A non-reversible electric motor provides higher torque than a reversible motor, and because of this, the displacement of seat base 2 in relation to fixation means 3 to transition from one configuration to another of seat 1 is easily driven by the non-reversible electric motor 5. There is no need to lighten the elements of seat 1, and particularly its seat base 2, so that the electric motor 5 is capable of driving the displacement of seat base 2 in relation to fixation means 3. This enables the design of seat 1 according to the present disclosure to be simplified and its cost to be reduced.

In addition, the electric motor 5 being non-reversible, when it is not activated, for example when it is not electrically powered, it prevents the rotation of front connecting rod 41 in relation to fixation means 3 about first transverse axis Y1 at its first longitudinal end E41, and thus ensures that seat base 2 is held in position in relation to fixation means 3. Unlike comparable vehicle seats, seat 1 according to the present disclosure does not require additional locking means, notably electric locking means, to lock seat base 2 in position in relation to fixation means 3 after its displacement driven by the electric motor 5, which therefore enables its design to be simplified and its cost to be reduced.

Seat 1 according to the present disclosure may easily take different configurations based on the needs of the user(s) of the vehicle receiving seat 1 according to the present disclosure.

Seat 1 may, for example, take a configuration referred to as nominal, similar to that described above in the introduction of the present application, and represented in the embodiment examples of FIG. 1 to 3.

As seen in the embodiment examples of FIG. 1 to 3, in this nominal configuration, seat base 2 may substantially extend along the longitudinal direction X of seat 1, substantially parallel to the floor of the vehicle receiving seat 1. A user may therefore sit on seat 1 according to the present disclosure, particularly when the vehicle is in operation.

In such a configuration, front connecting rod 41 may be configured so as to extend substantially along the vertical direction Z of seat 1, with its second longitudinal end E41' positioned above its first longitudinal end E41' along the vertical direction Z of seat 1, while lower rear connecting rod 42 may be configured so as to extend along a substantially longitudinal direction of seat 1, with its first longitudinal end E42 in front of its second longitudinal end E42'. Upper rear connecting rod 43 may, however, be configured so as to be substantially adjacent to the lower rear connecting rod 42. First locking means 6 is arranged to be in its locked state in this configuration.

The seat may, for example, also take a configuration referred to as easy entry, similar to that described above in the introduction of the present application, and represented in the embodiment examples of FIG. 4 to 6.

As explained above, such a configuration enables the passage behind seat 1 to be cleared, for example to enable users to enter or exit the vehicle receiving seat 1, by passing behind seat 1, particularly when it is a vehicle lacking rear doors.

In such a configuration, seat base 2 is displaced in relation to fixation means 3 along the longitudinal direction X and along the vertical direction Z of seat 1, in relation to the nominal configuration.

Connecting means 4 may thus be configured so that, in relation to the nominal position:
- the front edge AV of seat base 2 is displaced forward, along the longitudinal direction X of seat 1, and moved closer to fixation means 3 along the vertical direction Z of seat 1,
- the rear edge AR of seat base 2 is displaced forward, along the longitudinal direction X of seat 1, and moved away from fixation means 3 along the vertical direction Z of seat 1.

In such a configuration, front connecting rod 41 may be configured so as to be tilted towards the front of seat 1, i.e. its second longitudinal end E41' is in front of its first longitudinal end E41 along the longitudinal direction X of seat 1, while lower rear connecting rod 42 may be configured so as to be substantially tilted along the vertical direction Z of seat 1, or else slightly tilted towards the back of seat 1, i.e. with its second longitudinal end E42' in back of its first longitudinal end E42 along the longitudinal direction X of seat 1.

The first locking means 5 is arranged to also be in its locked state in this configuration, and therefore, upper rear connecting rod 43 may be configured so as to be substantially fitted against the lower rear connecting rod 42.

The transition from the nominal configuration to the easy entry configuration, or conversely, is done by use of the activated electric motor 5, which drives the rotation of front connecting rod 41 about first transverse axis Y1 of seat 1 at its first longitudinal end E41. When electric motor 5 stops, seat base 2 is blocked in the desired configuration, the electric motor 5 being non-reversible.

Seat 1 may, for example, also take a configuration referred to as panic exit represented in the embodiment examples in FIG. 7 to 10.

Like the easy entry configuration, such a configuration enables the passage behind the seat to be cleared, for example to enable users to quickly exit the vehicle receiving seat 1, by passing behind the seat 1, particularly when it is a vehicle lacking rear doors, and particularly in the event of a crash of the vehicle, and without operating the electric motor 5.

Connection means 4 may therefore be configured such that, in relation to the nominal configuration:
- the front edge AV of seat base 2 remains in a position substantially identical to that taken in the nominal configuration,
- the rear edge AR of seat base 2 is displaced forward, along the longitudinal direction X of seat 1, and moved away from fixation means 3 along the vertical direction Z of seat 1.

In such a configuration, front connecting rod 41 may be configured so as to substantially extend along the vertical direction Z of seat 1, with its second longitudinal end E41' positioned above its first longitudinal end E41 along the vertical direction Z of seat 1, as in the nominal configuration, while lower rear connecting rod 42 may be configured so as to be substantially tilted along the vertical direction Z of seat 1, and particularly slightly tilted towards the back of seat 1, i.e. with its second longitudinal end E42' in back of its first longitudinal end E42 along the longitudinal direction X of seat 1.

First locking means 6 is arranged to be in its unlocked state in this configuration, for example following an action by a user, and particularly a user located behind seat 1 according to the present disclosure, along the longitudinal direction X of seat 1. Therefore, upper rear connecting rod 43 may be configured so as to be substantially aligned with the lower rear connecting rod 42, with its second longitudinal end E43' above, along the vertical direction Z of seat 1, and behind, along the longitudinal direction X of seat 1, its first longitudinal end E43.

The transition from the nominal configuration to the panic exit configuration, or conversely, is done manually by a user, and particularly a user located behind seat 1 according to the present disclosure, who, after the transition of the first locking means 6 to its unlocked state, may apply a push force on seat base 2, advantageously at its rear edge AR, the push force being upward along the vertical direction Z of seat 1, and forward along the longitudinal direction X of seat 1, so as to drive the rotation of seat base 2 in relation to fixation means 3 about the second transverse axis Y2 of seat 1, at the second longitudinal end E41' of front connecting rod 41.

Electric motor 5 being non-reversible, and arranged to be inactivated following the transition of seat 1 to its nominal configuration, front connecting rod 41 remains fixed in relation to fixation means 3, the rod being unable to pivot about the first transverse axis Y1 of seat 1 at its first longitudinal end E41.

Therefore, thanks to seat 1 according to the present disclosure, a user, particularly a user located behind seat 1 according to the longitudinal direction X, may manually and rapidly drive the transition from the nominal to the panic exit configuration, which would allow the user to quickly evacuate the vehicle in the event of a crash.

Advantageously, the first locking means 6 may be arranged to be able to transition from its locked state to its unlocked state only when the non-reversible motor 5 is inactivated.

This advantageously makes it possible to prevent upper rear connecting rod 43 from being able to pivot in relation to lower rear connecting rod 42 about the fifth transverse axis Y5 when the non-reversible motor 5 is activated, particularly during the transition of seat 1 from its nominal configuration to its easy entry configuration, or conversely, and for example to avoid the risk of injuring a user who may be sitting on the seat 1, or else behind the seat 1.

According to one embodiment, and as seen more specifically in the embodiment examples in FIGS. 2, 3, 5, 6, 8 and 9, first locking means 6 comprises:
- a hook 61 pivotably mounted on lower rear connecting rod 42 along a sixth transverse axis Y6 of seat 1,
- a pin 62 arranged on upper rear connecting rod 43 and extending along the transverse direction Y of seat 1.

According to such an embodiment, hook 61 and pin 62 may advantageously be configured such that first manual locking means 6 transitions from its locked state to its unlocked state, and conversely, by rotation of hook 61 in relation to lower rear connecting rod 42 about the sixth transverse axis Y6 of seat 1, with:
- hook 61 engaged with the pin 62 in the locked state of the first locking means 6, and
- hook 61 separated from pin 62 in the unlocked state of the first locking means 6.

Such a first locking means 6 has a simple design and does not substantially increase the production cost of seat 1 according to the present disclosure. It also presents a reduced size, and therefore does not substantially increase the size of the seat according to the present disclosure.

Advantageously, first locking means 6 may further comprise a spring element (not represented) configured so as to urge the first locking means 6 into its locked state, such that first locking means 6 is found by default in its locked state.

For example, such a spring element may be configured so as to urge hook 61 into its position of engagement with pin 62.

According to one embodiment, and as also seen in the embodiment examples in FIGS. 2, 3, 5, 6, 8 and 9, hook 61 is pivotably mounted on lower rear connecting rod 42 along the sixth transverse axis Y6 at an intermediate point 142 of the lower rear connecting rod 42 between the first longitudinal end E42 and the second longitudinal end E42'.

This advantageous arrangement of the present disclosure minimizes the size of hook 61, and therefore of the first locking means 6 of seat 1.

Advantageously, the intermediate point 142 may be closer to the second longitudinal end E42' of lower rear connecting rod 42 than to the first longitudinal end E42.

Pin 62 may advantageously be arranged as one piece and may be integrally formed with upper rear connecting rod 43. It may also be positioned between the first longitudinal end E43 and the second longitudinal end E43' of upper rear connecting rod 43, and advantageously may be in the middle of these two longitudinal ends E43, E43', or else slightly closer to the first longitudinal end E43.

According to one embodiment, seat 1 further comprises a first manual control means 7 coupled to the first locking means 6, the first control means 7 being configured so as to drive the transition of first locking means 6 from its locked state to its unlocked state, and conversely, under the effect of a manual action by a user on first manual control means 7.

This advantageously enables a user to manually change the state of first locking means 6. For example, in the event of an emergency, particularly in the event of an accident of the vehicle receiving seat 1 according to the present disclosure, and if seat 1 is in its nominal configuration, a user may manually transition the first locking means 6 into its unlocked state, so as to enable the transition of seat 1 from its nominal configuration to its panic exit configuration, as described above.

Advantageously, the first manual control means 7 may be configured to also enable the manual manipulation of seat 1, and particularly of seat base 2 by a user, particularly a user located behind seat 1 along the longitudinal direction X, for example to transition from the nominal configuration to the panic exit configuration, as described above.

Alternatively or in addition, and without departing from the scope of the present disclosure, first locking means 6 may comprise an actuator, and particularly an electric actuator, configured to drive the automatic transition of first locking means 6 from its locked state to its unlocked state, and conversely.

Figure 8:
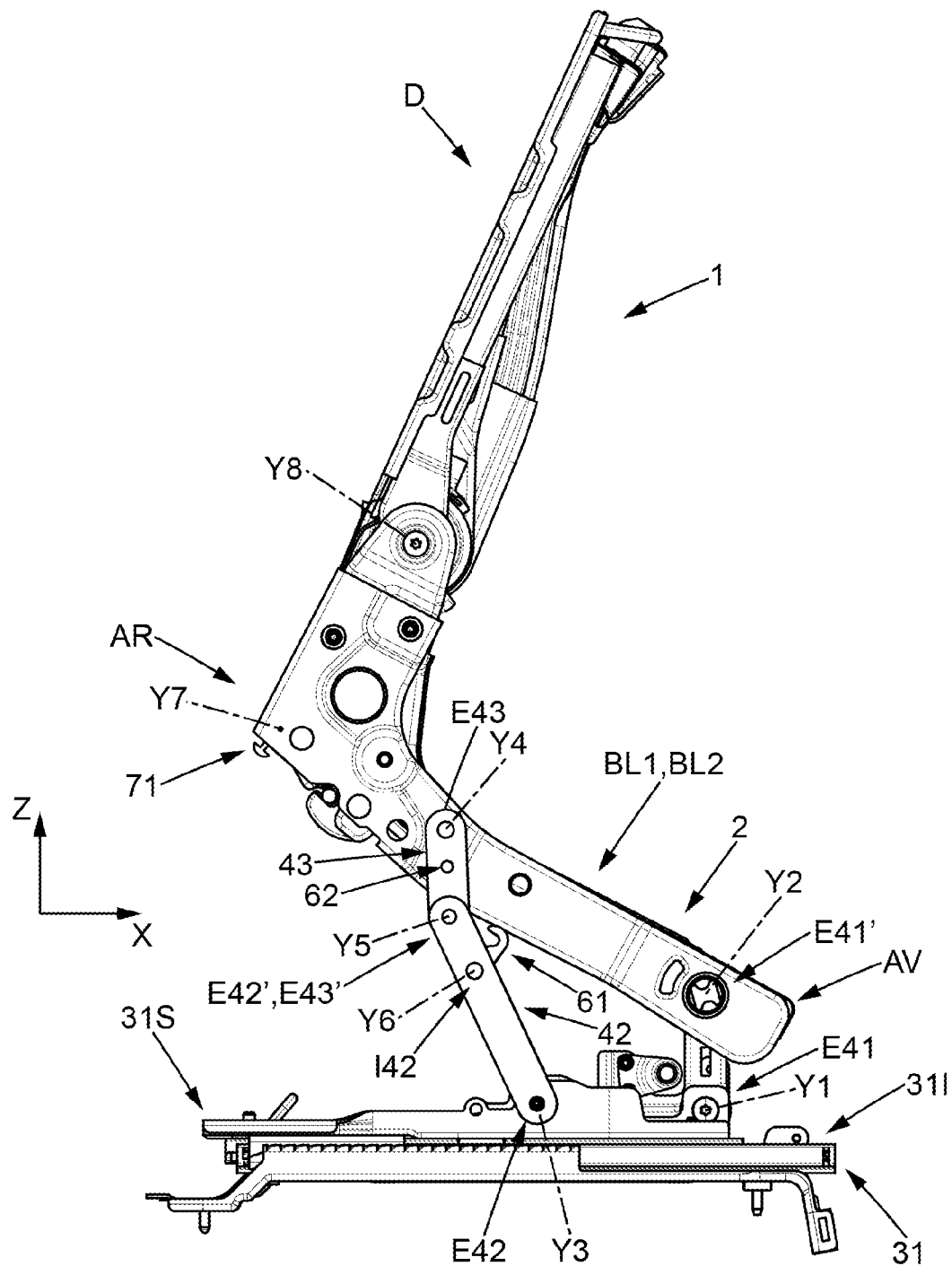
FIG. 8 shows a side view of the seat from FIG. 7, wherein certain elements have been made transparent.
Figure 9:
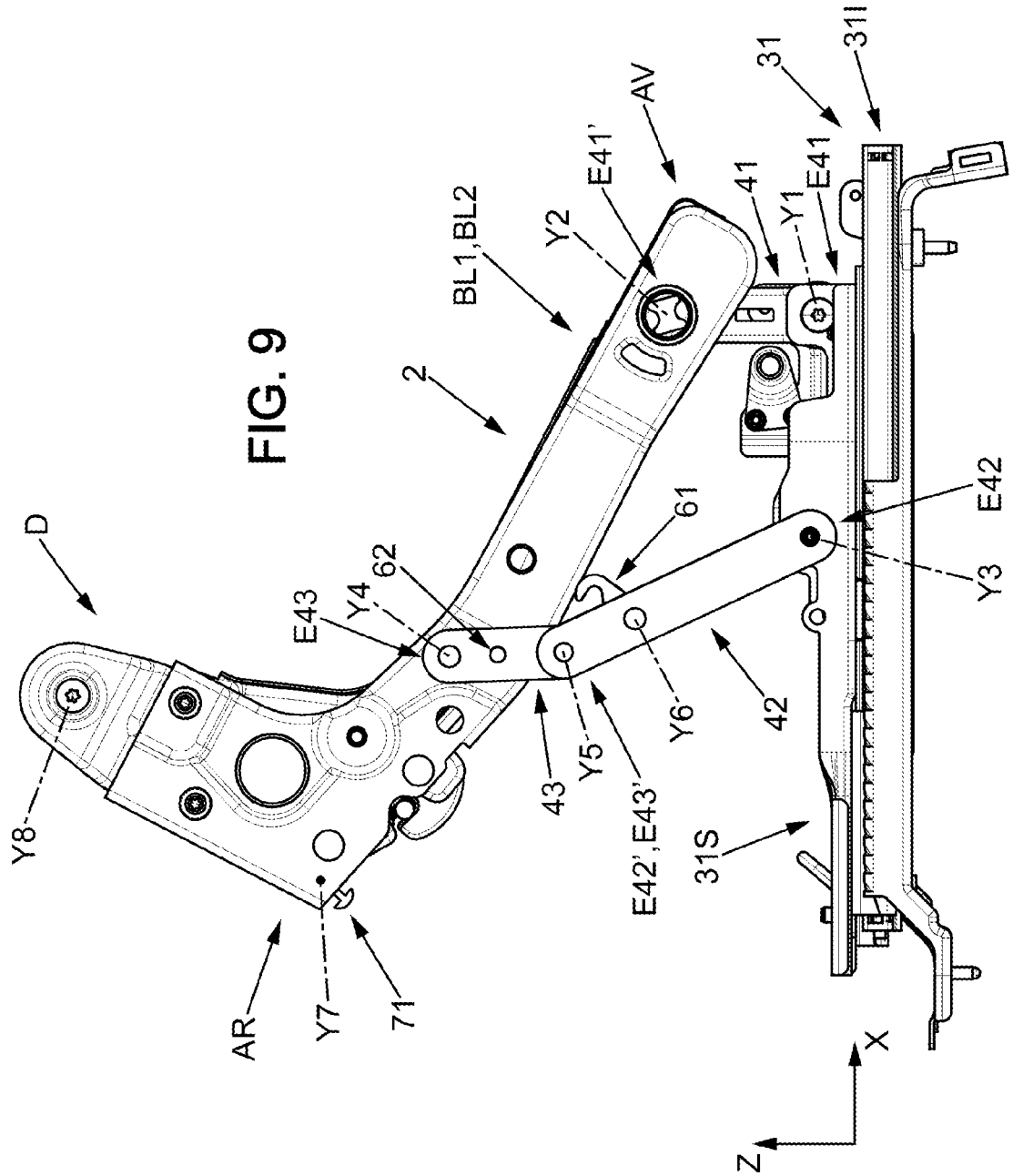
FIG. 9 shows a detail view of FIG. 8.

According to one embodiment, and as seen in the embodiment examples in FIGS. 2, 5 and 8, first manual control means 7 comprises a knob 71 pivotably mounted on seat base 2 along a seventh transverse axis Y7 of seat 1, the knob 71 being configured to transition:

from a first position about the seventh transverse axis Y7 of seat 1, wherein first locking means 6 is in its locked position, to a second position about the seventh transverse axis Y7 of seat 1, wherein first locking means 6 is in its unlocked state.

Advantageously, and in order to facilitate the manipulation of the knob 71 by a user, it may substantially extend over the entire width of seat base 2 along the transverse direction Y of seat 1.

Alternatively, and without departing from the scope of the present disclosure, first manual control means 7 may comprise other suitable manual activation elements, such as, for example, a lever, a push button, etc.

According to one embodiment, first control means 7 comprises a spring element (not represented) configured to urge knob 71 into the second position about the seventh transverse axis Y7 of seat 1.

Therefore, thanks to this advantageous provision of the present disclosure, first locking means 6 is by default, i.e. without necessitating any manual action by the user on control means 7, in its locked state. Such a spring means may be provided as an alternative or in addition to the spring element of the first locking means 6, as described above.

According to one embodiment, knob 71 is mounted on seat base 2 at its rear edge AR, projecting towards the bottom of seat base 2 along the vertical direction Z of seat 1.

Therefore, thanks to this advantageous provision of the present disclosure, when the seat is in the nominal or panic exit configuration, a user located behind seat 1, along its longitudinal direction X, has no chance of inadvertently activating first control means 7 and driving the transition of first locking means 6 from its locked state to its unlocked state, as well as possibly the displacement of seat base 2 in relation to fixation means 3.

Without departing from the scope of the present disclosure, knob 71 may also be mounted on seat base 2 at its rear edge AR, projecting towards the back of seat base 2 along the longitudinal direction X of seat 1.

According to one embodiment, fixation means 3 comprises two slide rails 31, arranged on both sides of lower base 2 along the transverse direction Y of lower base 2, each presenting a lower profile 31I configured to be fixed to the floor of the vehicle, and slidingly receiving, along the longitudinal direction X of seat 1, an upper profile 31S.

According to such an embodiment, first longitudinal end E41 of front connecting rod 41 and first longitudinal end E42 of lower rear connecting rod 42 may be pivotably hinged, respectively along the first transverse axis Y1 and along the third transverse axis Y3, to the upper profile 31S of a slide rail 31.

According to one embodiment, seat 1 further comprises a second locking means 8 for locking slide rails 31, configured to transition:

from a locked state, wherein the second locking means 8 prevents the sliding of upper profile 31S of each of slide rails 31 in relation to lower profile 31I of each of slide rails 31, so as to prevent the translational displacement of seat 1 in relation to the floor of the vehicle along the longitudinal direction X of seat 1, to an unlocked state, wherein the second locking means 8 enables the sliding of upper profile 31S of each of slide rails 31 in relation to lower profile 31I of each of slide rails 31, so as to enable the translational displacement of seat 1 in relation to the floor of the vehicle along the longitudinal direction X of seat 1, and conversely.

According to one embodiment, seat 1 further comprises a second manual control means coupled to second locking means 8, the second manual control means being configured so as to drive the transition of second locking means 8 from its locked state to its unlocked state, and conversely, under the effect of a manual action by a user on the second manual control means.

This advantageously enables a user to manually change the state of second locking means 8. For example, in the event of an emergency, particularly in the event of an accident of the vehicle receiving seat 1 according to the present disclosure, a user may manually transition the second locking means 8 into its unlocked state, so as to enable seat 1 to slide in relation to the floor of the vehicle along the longitudinal direction X.

Alternatively or in addition, and without departing from the scope of the present disclosure, second locking means 8 may comprise an actuator, and particularly an electric actuator, configured to drive the automatic transition of second locking means 8 from its locked state to its unlocked state, and conversely.

According to one embodiment, the second manual control means is the first manual control means 7, such that a manual action by a user on the first manual control means 7 enables the locking means 8 to transition from its locked state to its unlocked state, and conversely.

This advantageous provision of the present disclosure enables the design of seat 1 according to the present disclosure to be simplified and its production cost to be reduced, in that first control means 7 simultaneously cooperates with first locking means 6 and second locking means 8.

Advantageously, when a user manually activates first control means 7, the means is therefore able to drive simultaneously the displacement of seat base 2 in relation to fixation means 3, i.e. slide rails 31, about the second transverse axis Y2, at the second longitudinal end E41' of front connecting rod 41, and the displacement of upper profile 31S in relation to lower profile 31I of slide rails 31 along the longitudinal direction X of seat 1, and in order to maximize the space behind seat 1 along its longitudinal direction X.

Therefore, if seat 1 is in the nominal configuration and a user wishes to rapidly and simply clear the space behind seat 1 along its longitudinal direction X, by transitioning it into the panic exit configuration with maximized space behind seat 1 along its longitudinal direction X, for example in order to be able to rapidly exit the vehicle, particularly in the event of a crash of the vehicle, the user may displace, simultaneously and in a single movement, seat base 2 in relation to the floor of the vehicle along the longitudinal direction X and along the vertical direction Z of seat 1.

According to one embodiment, seat 1 further comprises a third locking means 9 for locking seat base 2 in relation to fixation means 3, configured to transition:
from a locked state, wherein the third locking means 9 prevents the displacement of seat base 2 in relation to fixation means 3 by use of connection means 4, to
an unlocked state, wherein the third locking means 9 enables the displacement of seat base 2 in relation to fixation means 3 by use of connection means 4, and conversely.

In particular, for the transition of seat 1 from its nominal configuration to its easy entry configuration or to its panic exit configuration, third locking means 9 may be in its unlocked state.

In addition, in order to increase the stability of seat 1 in relation to fixation means 3, and therefore in relation to the vehicle floor, the third locking means 9 may be in its locked state, so as to prevent the displacement of seat base 2 in relation to fixation means 3 by use of connection means 4, and in addition to the retention ensured by the inactivated non-reversible motor 5, as explained above.

According to one embodiment, seat 1 further comprises a third manual control means coupled to third locking means 9, the third manual control means being configured so as to drive the transition of third locking means 9 from its locked state to its unlocked state, and conversely, under the effect of a manual action by a user on the third manual control means.

This advantageously enables a user to manually change the state of third locking means 9. For example, in the event of an emergency, particularly in the event of an accident of the vehicle receiving seat 1 according to the present disclosure, a user may manually transition third locking means 9 into its unlocked state, so as to enable the transition of seat 1 from its nominal configuration to its easy entry configuration, as explained above.

Alternatively or in addition, and without departing from the scope of the present disclosure, third locking means 9 may comprise an actuator, and particularly an electric actuator, configured to drive the automatic transition of third locking means 9 from its locked state to its unlocked state, and conversely.

As seen more specifically in the embodiment example in FIG. 10, third locking means 9 may comprise:
a hook 91, integral with seat base 2, and particularly placed near rear edge AR of seat base 2, and
a catch 92, integral with fixation means 3, and particularly with upper profile 31S of a slide rail 31.

Hook 91 and catch 92 may advantageously be configured such that:
hook 91 is engaged with the catch 92 in the locked state of third locking means 9, and that
hook 91 is separated from the catch 92 in the unlocked state of third locking means 9.

In particular, hook 91 may comprise a groove R91, third locking means 9 being advantageously configured so that the catch 92 is received in the groove R91 and held in position in relation to hook 91 in the locked state of third locking means 9, or, in order to receive and enable displacement, that the catch 92 is received in the groove R91 and is able to be displaced in relation to hook 91 into the unlocked state of third locking means 9.

According to one embodiment, the third manual control means is the first manual control means 7, such that a manual action by a user on the first manual control means 7 enables the third locking means 9 to transition from its locked state to its unlocked state, and conversely.

This advantageous provision of the present disclosure enables the design of seat 1 according to the present disclosure to be simplified and its production cost to be reduced, in that first control means 7 simultaneously cooperates with first locking means 6 and third locking means 9, or even with second locking means 8, as explained above.

Advantageously, when a user manually activates only first control means 7, the control means may therefore drive the displacement of seat base 2 in relation to fixation means 3, so as to transition seat 1 from its nominal configuration to its panic exit configuration, as explained above.

Therefore, if seat 1 is in the nominal configuration, and a user wishes to rapidly and simply clear the space behind seat 1 along its longitudinal direction X, by transitioning it into the panic exit configuration, for example in order to be able to quickly exit the vehicle, particularly in the event of a crash of the vehicle, first 6 and third 9 locking means may transition simultaneously into their unlocked states by a simple action of a user on first manual control means 7.

Alternatively, and without departing from the scope of the present disclosure, the third manual control means may be the second manual control means.

According to one embodiment, and as seen more specifically in the embodiment examples of FIGS. 2, 3, 5, 6, 8 and 9:
second longitudinal end E41' of front connecting rod 41 is pivotably connected to the first or second lateral edge BL1, BL2 of seat base 2 along the second transverse axis Y2, and/or, first longitudinal end E43 of upper rear connecting rod 43 is pivotably hinged to the first or second lateral edge BL1, BL2 of seat base 2 along the fourth transverse axis Y4.

Advantageously, in such an embodiment, and if fixation means 3 of seat 1 comprise two slide rails 31 with an upper profile 31S and a lower profile 31I, as described above:
first longitudinal end E41 of front connecting rod 41 is pivotably hinged along the first transverse axis Y1 of seat 1 to upper profile 31S of the slide rail 31 closest to the lateral edge BL1, BL2 to which second longitudinal end E41' of front connecting rod 41 is hinged, and/or,
first longitudinal end E42 of lower rear connecting rod 42 is pivotably hinged along the third transverse axis Y3 of seat 1 to upper profile 31S of the slide rail 31 closest to the lateral edge BL1, BL2 to which first longitudinal end E43 of upper rear connecting rod 43 is hinged.

According to one embodiment, connection means 4 comprise:
two parallel front connecting rods 41 that are notably identical, each positioned on one side of seat base 2 along the transverse direction Y of seat 1, and/or
two parallel lower rear connecting rods 42 that are notably identical, each positioned on one side of seat base 2 along the transverse direction Y of seat 1, and/or
two parallel upper rear connecting rods 43 that are notably identical, each positioned on one side of seat base 2 along the transverse direction Y of seat 1.

All provisions described previously relating to front connecting rod 41 and/or to lower rear connecting rod 42 and/or to upper rear connecting rod 43 apply, alone or in combination, to each of front connecting rods 41, respectively to each of lower rear connecting rods 42, respectively to each of upper rear connecting rods 43.

Advantageously, and as seen in the embodiment examples of FIGS. 1, 4 and 7:
second longitudinal end E41' of each front connecting rod 41 may be hinged to a separate lateral edge BL1, BL2 of the seat base 2, and/or
first longitudinal end E41 of each front connecting rod 41 may be hinged to the upper profile 31S of a separate slide rail 31, and/or
first longitudinal end E42 of each lower rear connecting rod 42 may be hinged to the upper profile 31S of a separate slide rail 31, and/or
first longitudinal end E43 of each upper rear connecting rod 43 may be hinged to a separate lateral edge BL1, BL2 of the seat base 2.

The present disclosure also relates to a vehicle comprising a seat according to the present disclosure.

The vehicle may be, in particular, a motor vehicle.

All provisions described previously relating to a vehicle receiving seat 1 according to the present disclosure apply to the vehicle according to the present disclosure.

A vehicle generally comprises at least one seat, intended to accommodate a driver or a passenger of the vehicle, hereafter designated by the term "user." The seat may be intended to accommodate a single person or several persons seated side-by-side, and may be placed at the front or the rear of the vehicle. In addition, the present disclosure may be implemented for seats intended for any type of vehicle, and particularly for motor vehicles.

A vehicle seat generally comprises a seat base, configured to be connected to the floor of a vehicle, particularly with means for fixing to the floor of the vehicle, generally in the form of two slide rails, placed on both sides of the lower base, configured to be fixed to the floor of the vehicle and to enable sliding of the seat in relation to the floor of the vehicle along the longitudinal direction of the seat.

The seat base presents a front edge and a rear edge interconnected by a first lateral edge and a second lateral edge, the seat base being configured so as to accommodate at least one user.

The seat may also comprise at least one backrest, pivotably hinged along a transverse axis of the seat to the seat base, at its rear edge.

The seat base may be connected to the fixation means by connection means configured to enable displacement of the seat base in relation to the fixation means along the longitudinal direction and along the vertical direction of the seat, and therefore in relation to the floor of the vehicle, so as to adopt different positions offering different configurations of use to the seat.

The different configurations particularly correspond to the different possible positions of the back in relation to the seat base, combined with the different possible positions of the seat base in relation to the fixation means.

For example, when a user is seated on the seat of the vehicle, particularly when the vehicle is in operation, the seat could be expected to be found in a configuration referred as nominal, wherein the seat base is substantially parallel to the floor of the vehicle, while the backrest substantially extends along the vertical direction of the vehicle, substantially corresponding to the vertical direction of the seat when the seat is fixed to the floor of the vehicle, and substantially perpendicularly to the floor of the vehicle.

In order to clear the passage behind the seat, for example to enable users to enter or exit the vehicle receiving the seat, by passing behind the seat, particularly when it is a vehicle lacking rear doors, a configuration referred to as easy entry may be provided, wherein the rear edge of the seat base is displaced upward, along the vertical direction of the seat, and forward, along the longitudinal direction of the seat, in relation to its position in the nominal configuration. In such a configuration, the front edge of the seat base is arranged to be displaced forward, along the longitudinal direction of the seat, while moving closer to the fixation means, along the vertical direction of the seat. Advantageously, in this easy entry configuration, the backrest may also be tilted towards the seat base, so as to maximize the space behind of the seat.

To facilitate displacement of the seat base in relation to the fixation means, for the passage of the seat from its nominal configuration to its easy entry configuration, and conversely, it is referred to use an electric motor driving the rotation of the front edge of the seat base in relation to the fixation means about a transverse axis of the seat. To that effect, the seat base may be connected to the means for fixing to the vehicle floor by use of a connecting rod hinged to the means for fixing to the vehicle floor at a first longitudinal end and to the seat base at a second longitudinal end. The electric motor is generally arranged to drive the rotation of this connecting rod in relation to the means for fixing to the vehicle floor at the first longitudinal end.

It may also be desirable to be able to displace the seat base in relation to the means for fixing to the vehicle floor by moving the rear edge of the seat base away from the means for fixing to the vehicle floor along the vertical direction of the seat, so as to clear the passage behind the seat, in a manual manner, i.e. without using the electric motor driving the rotation of the connecting rod connected to the front edge of the seat base, particularly in the event of a crash of the vehicle using a rapid exit of its occupants, and particularly those behind the seat, or if the motor has been deactivated or damaged.

To that effect, a reversible electric motor may be provided. A reversible electric motor, for example, is a motor configured to enable the rotation of its rotor, respectively its stator, in relation to its stator, respectively its rotor, when it is not activated, in order to enable the manual displacement of the seat base in relation to the means for fixing to the vehicle floor. However, the use of a reversible electric motor presents several disadvantages.

First, the use of such a reversible electric motor means that one or more additional locking means are used, configured to block the displacement of the seat base in relation to the means for fixing to the vehicle floor when it is in the desired position. This complicates the design of such a seat and substantially increases its cost.

In addition, reversible electric motors generally deliver lower torque than irreversible motors, which may complicate the design of the seat according to the present disclosure, in that its elements should be, for example, made lighter to enable driving the displacement of the seat base in relation to the means for fixing to the vehicle floor, and particularly by use of a connecting rod such as described above, the lever arm between the two ends of such a connecting rod generally being made smaller.

The present disclosure aims to mitigate the deficiencies of comparable vehicle seats by proposing a vehicle seat capable of passing automatically, by means of an electric motor, between different configurations, and particularly between the nominal and easy entry configurations, such as described above, and wherein the displacement of the seat base in relation to the floor of the vehicle from its position in the nominal configuration, so as to move its rear edge away from the floor of the vehicle along the vertical direction of the vehicle, may be performed manually by a user, with a simplified design and low production cost.

A vehicle seat is proposed comprising:
  a seat base presenting a front edge and a rear edge interconnected by a first lateral edge and a second lateral edge,
  fixation means for fixing the seat base to the floor of a vehicle,
  connection means for connecting the seat base to the fixation means, configured so as to enable the displacement of the seat base in relation to the fixation means along the longitudinal direction and along the vertical direction of the seat.

According to the present disclosure, the connection means comprise:
  a front connecting rod presenting a first longitudinal end pivotably hinged along a first transverse axis of the seat to the fixation means and a second longitudinal end pivotably hinged along a second transverse axis to the seat base, at its front edge,
  a lower rear connecting rod presenting a first longitudinal end pivotably hinged along a third transverse axis of the seat to the fixation means and a second longitudinal end,
  an upper rear connecting rod presenting a first longitudinal end pivotably hinged along a fourth transverse axis to the seat base, at its rear edge, and a second longitudinal end pivotably hinged along a fifth transverse axis to the second longitudinal end of the lower rear connecting rod.

According to the present disclosure, the seat further comprises a non-reversible electric motor configured to:
  drive the rotation of the front connecting rod in relation to the fixation means about the first transverse axis at its first longitudinal end, when activated, and
  prevent the rotation of the front connecting rod in relation to the fixation means about the first transverse axis at its first longitudinal end, when inactivated.

According to the present disclosure, the seat further comprises a first locking means able to transition:
  from a locked state, wherein the first locking means prevents the rotation of the lower rear connecting rod in relation to the upper rear connecting rod about the fifth transverse axis, to
  an unlocked state, wherein the first locking means enables the rotation of the lower rear connecting rod in relation to the upper rear connecting rod about the fifth transverse axis, so as to enable pivoting of the seat base at the second longitudinal end of the front connecting rod about the second transverse axis of the seat so as to move the rear edge of the seat base away from or closer to the fixation means along the vertical direction of the seat, and conversely.

According to optional characteristics of the present disclosure, taken alone or in combination:
  the first locking means is arranged to be able to transition from its locked state to its unlocked state only when the non-reversible motor is inactivated;
  the first locking means comprises:
    a hook pivotably mounted on the lower rear connecting rod along a sixth transverse axis of the seat,
    a pin arranged on the upper rear connecting rod and extending along the transverse direction of the seat, the hook and the pin being configured such that the first locking means transitions from its locked state to its unlocked state, and conversely, by rotation of the hook in relation to the lower rear connecting rod about the sixth transverse axis of the seat, with:
      the hook engaged with the pin in the locked state of the first locking means, and
      the hook separated from the pin in the unlocked state of the first locking means;
  the hook is pivotably mounted on the lower rear connecting rod along the sixth transverse axis at an intermediate point of the lower rear connecting rod between the first longitudinal end and the second longitudinal end;
  the seat further comprises a first manual control means coupled to the first locking means, the first control means being configured so as to drive the transition of the first locking means from its locked state to its unlocked state, and conversely, under the effect of a manual action by a user on the first manual control means;
  the first manual control means comprises a knob pivotably mounted on the seat base along a seventh transverse axis of the seat, the knob being configured to transition:
    from a first position about the seventh transverse axis of the seat, wherein the first locking means is in its locked state, to
    a second position about the seventh transverse axis of the seat, wherein the first locking means is in its unlocked state;
  the first manual control means comprises a spring element configured to urge the knob into the second position about the seventh transverse axis of the seat;
  the knob is mounted on the seat base at its rear edge, projecting towards the bottom of the seat base along the vertical direction of the seat;
  the fixation means comprise two slide rails, arranged on both sides of the lower base along the transverse direction of the lower base, each presenting a lower profile configured to be fixed to the floor of the vehicle, and slidingly receiving, along the longitudinal direction of the seat, an upper profile, and the first longitudinal end of the front connecting rod and the first longitudinal end of the lower rear connecting rod are pivotably hinged, respectively along the first transverse axis and along the third transverse axis, to the upper profile of a slide rail;

the seat further comprises a second locking means for locking the slide rails, configured to transition:

from a locked state, wherein the second locking means prevents the sliding of the upper profile of each of the slide rails in relation to the lower profile of each of the slide rails, so as to prevent the translational displacement of the seat in relation to the floor of the vehicle along the longitudinal direction of the seat, to an unlocked state, wherein the second locking means enables the sliding of the upper profile of each of the slide rails in relation to the lower profile of each of the slide rails, so as to enable the translational displacement of the seat in relation to the floor of the vehicle along the longitudinal direction of the seat, and conversely, and the control means cooperates with the slide rail locking means such that a manual action by a user on the control means enables the locking means to transition from its locked state to its unlocked state, and conversely;

the seat further comprises a second manual control means coupled to the second locking means, the second manual control means being configured so as to drive the transition of the second locking means from its locked state to its unlocked state, and conversely, under the effect of a manual action by a user on the second manual control means;

the second manual control means is the first manual control means, such that a manual action by a user on the first manual control means enables the second locking means to transition from its locked state to its unlocked state, and conversely;

the seat further comprises a third locking means for locking the seat base in relation to the fixation means, configured to transition:

from a locked state, wherein the third locking means prevents the displacement of the seat base in relation to the fixation means by use of the connection means, to an unlocked state, wherein the third locking means enables the displacement of the seat base in relation to the fixation means by use of the connection means, and conversely;

the seat further comprises a third manual control means coupled to the third locking means, the third manual control means being configured so as to drive the transition of the third locking means from its locked state to its unlocked state and conversely, under the effect of a manual action by a user on the third manual control means;

the third manual control means is the first manual control means, such that a manual action by a user on the first manual control means enables the third locking means to transition from its locked state to its unlocked state, and conversely;

the second longitudinal end of the front connecting rod is pivotably hinged to the first or to the second lateral edge of the seat base along the second transverse axis, and/or the first longitudinal end of the upper rear connecting rod is pivotably hinged to the first or to the second lateral edge of the seat base along the fourth transverse axis;

the connection means comprise:

two parallel front connecting rods that are notably identical, each positioned on one side of the seat base along the transverse direction of the seat, and/or two parallel lower rear connecting rods that are notably identical, each positioned on one side of the seat base along the transverse direction of the seat, and/or two parallel upper rear connecting rods that are notably identical, each positioned on one side of the seat base along the transverse direction of the seat.

According to another aspect, a vehicle comprising a seat according to the present disclosure is proposed.

The features specified in the following paragraphs may, optionally, be implemented. The features may be implemented independently from each other or in combination with each other.

A seat (1) of a vehicle comprising: a seat base (2), fixation means (3) for fixing to the floor of a vehicle, a front connecting rod (41) pivoting along a first axis (Y1) at the fixation means (3) and along a second axis (Y2) at the base (2), a lower rear connecting rod (42) pivoting along a third axis (Y3) at the fixation means (3), an upper rear connecting rod (43) pivoting along a fourth axis (Y4) at the base (2) and along a fifth axis (Y5) at the lower rear connecting rod (42), a locking means (6) able to transition:

from a locked state, wherein it prevents the rotation of the lower rear connecting rod (42) in relation to the upper rear connecting rod (43), to an unlocked state, wherein it enables the rotation of the lower rear connecting rod (42) in relation to the upper rear connecting rod (43), and conversely.

The invention claimed is:

1. A vehicle seat comprising:

a seat base presenting a front edge and a rear edge interconnected by a first lateral edge and a second lateral edge, fixation means for fixing the seat base to a floor of a vehicle, connection means for connecting the seat base to the fixation means, configured so as to enable a displacement of the seat base in relation to the fixation means along a longitudinal direction and along a vertical direction of the seat, wherein the connection means comprise:

a front connecting rod presenting a first longitudinal end pivotably hinged along a first transverse axis of the seat to the fixation means and a second longitudinal end pivotably hinged along a second transverse axis to the seat base, at its front edge, a lower rear connecting rod presenting a first longitudinal end pivotably hinged along a third transverse axis of the seat to the fixation means and a second longitudinal end, an upper rear connecting rod presenting a first longitudinal end pivotably hinged along a fourth transverse axis to the seat base, at its rear edge, and a second longitudinal end pivotably hinged along a fifth transverse axis to the second longitudinal end of the lower rear connecting rod, wherein the seat further comprises a non-reversible electric motor configured to:

drive a rotation of the front connecting rod in relation to the fixation means about the first transverse axis at its first longitudinal end, when activated, and prevent the rotation of the front connecting rod in relation to the fixation means about the first transverse axis at its first longitudinal end, when inactivated, wherein the seat further comprises a first locking means able to transition:

from a locked state, wherein the first locking means prevents a rotation of the lower rear connecting rod in relation to the upper rear connecting rod about the fifth transverse axis, to an unlocked state, wherein the first locking means enables the rotation of the lower rear connecting rod in relation to the upper rear connecting rod about the fifth transverse axis, so as to enable pivoting of the seat base at the second longitudinal end of the front connecting rod about the second transverse axis of the seat so as to move the rear edge of the seat base closer to or away from the fixation means along the vertical direction of the seat, and conversely.

2. The vehicle seat of claim 1, wherein the first locking means is arranged to be able to transition from its locked state to its unlocked state only when the non-reversible motor is inactivated.

3. The vehicle seat of claim 1, wherein the first locking means comprises:

a hook pivotably mounted on the lower rear connecting rod along a sixth transverse axis of the seat, a pin arranged on the upper rear connecting rod and extending along the transverse direction of the seat, the hook and the pin being configured such that the first locking means transitions from its locked state to its unlocked state, and conversely, by rotation of the hook in relation to the lower rear connecting rod about the sixth transverse axis of the seat, with:

the hook engaged with the pin in the locked state of the first locking means, and the hook separated from the pin in the unlocked state of the first locking means.

4. The vehicle seat of claim 3, wherein the hook is pivotably mounted on the lower rear connecting rod along the sixth transverse axis at an intermediate point of the lower rear connecting rod between the first longitudinal end and the second longitudinal end.

5. The vehicle seat of claim 1, further comprising a first manual control means coupled to the first locking means, the first control means being configured so as to drive the transition of the first locking means from its locked state to its unlocked state, and conversely, under an effect of a manual action by a user on the first manual control means.

6. The vehicle seat of claim 5, wherein the first manual control means comprises a knob pivotably mounted on the seat base along a seventh transverse axis of the seat, the knob being configured to transition: from a first position about the seventh transverse axis of the seat, wherein the first locking means is in its locked state, to a second position about the seventh transverse axis of the seat, wherein the first locking means is in its unlocked state.

7. The vehicle seat of claim 6, wherein the first manual control means comprises a spring element configured to urge the knob into the second position about the seventh transverse axis of the seat.

8. The vehicle seat of claim 6, wherein the knob is mounted on the seat base at its rear edge, projecting towards the bottom of the seat base along the vertical direction of the seat.

9. The vehicle seat of claim 1, wherein the fixation means comprise two slide rails, arranged on both sides of the lower base along a transverse direction of the lower base, each presenting a lower profile configured to be fixed to the floor of the vehicle, and slidingly receiving, along the longitudinal direction of the seat, an upper profile, and wherein the first longitudinal end of the front connecting rod and the first longitudinal end of the lower rear connecting rod are pivotably hinged, respectively along the first transverse axis and along the third transverse axis, to the upper profile of a slide rail.

10. The vehicle seat of claim 9, further comprising a second locking means for locking the slide rails, configured to transition: from a locked state, wherein the second locking means prevents the sliding of the upper profile of each of the slide rails in relation to the lower profile of each of the slide rails, so as to prevent a translational displacement of the seat in relation to the floor of the vehicle along the longitudinal direction of the seat, to an unlocked state, wherein the second locking means enables the sliding of the upper profile of each of the slide rails in relation to the lower profile of each of the slide rails, so as to enable the translational displacement of the seat in relation to the floor of the vehicle along the longitudinal direction of the seat, and conversely.

11. The vehicle seat of claim 10, further comprising a second manual control means coupled to the second locking means, the second manual control means being configured so as to drive the transition of the second locking means from its locked state to its unlocked state, and conversely, under an effect of a manual action by a user on the second manual control means.

12. The vehicle seat of claim 10, further comprising a first manual control means coupled to the first locking means, the first control means being configured so as to drive the transition of the first locking means from its locked state to its unlocked state, and conversely, under an effect of a manual action by a user on the first manual control means, wherein the first control means simultaneously cooperates with first locking means and second locking means, such that a manual action by a user on the first manual control means enables the second locking means to transition from its locked state to its unlocked state, and conversely.

13. The vehicle seat of claim 1, further comprising a third locking means for locking the seat base in relation to the fixation means, configured to transition: from a locked state, wherein the third locking means prevents the displacement of the seat base in relation to the fixation means by use of the connection means, to an unlocked state, wherein the third locking means enables the displacement of the seat base in relation to the fixation means by use of the connection means, and conversely.

14. The vehicle seat of claim 13, further comprising a third manual control means coupled to the third locking means, the third manual control means being configured so as to drive the transition of the third locking means from its locked state to its unlocked state, and conversely, under an effect of a manual action by a user on the third manual control means.

15. The vehicle seat of claim 13, further comprising a first manual control means coupled to the first locking means, the first control means being configured so as to drive the transition of the first locking means from its locked state to its unlocked state, and conversely, under an effect of a manual action by a user on the first manual control means, wherein the first control means simultaneously cooperates with first locking means and third locking means, such that a manual action by a user on the first manual control means enables the third locking means to transition from its locked state to its unlocked state, and conversely.

16. The vehicle seat of claim 1 wherein the second longitudinal end of the front connecting rod is pivotably hinged to the first or to the second lateral edge of the seat base along the second transverse axis.

17. The vehicle seat of claim 1, wherein the connection means comprise: two parallel front connecting rods that are notably identical, each positioned on one side of the seat base along the transverse direction of the seat.

18. A vehicle comprising the vehicle seat according to claim 1.

19. The vehicle seat of claim 1, wherein the first longitudinal end of the upper rear connecting rod is pivotably hinged to the first or to the second lateral edge of the seat base along the fourth transverse axis.

20. The vehicle seat of claim 1, wherein the connection means comprise: two parallel lower rear connecting rods that are notably identical, each positioned on one side of the seat base along the transverse direction of the seat.

21. The vehicle seat of claim 1, wherein the connection means comprise: two parallel upper rear connecting rods that are notably identical, each positioned on one side of the seat base along the transverse direction of the seat.

\* \* \* \* \*